UNITED STATES PATENT OFFICE.

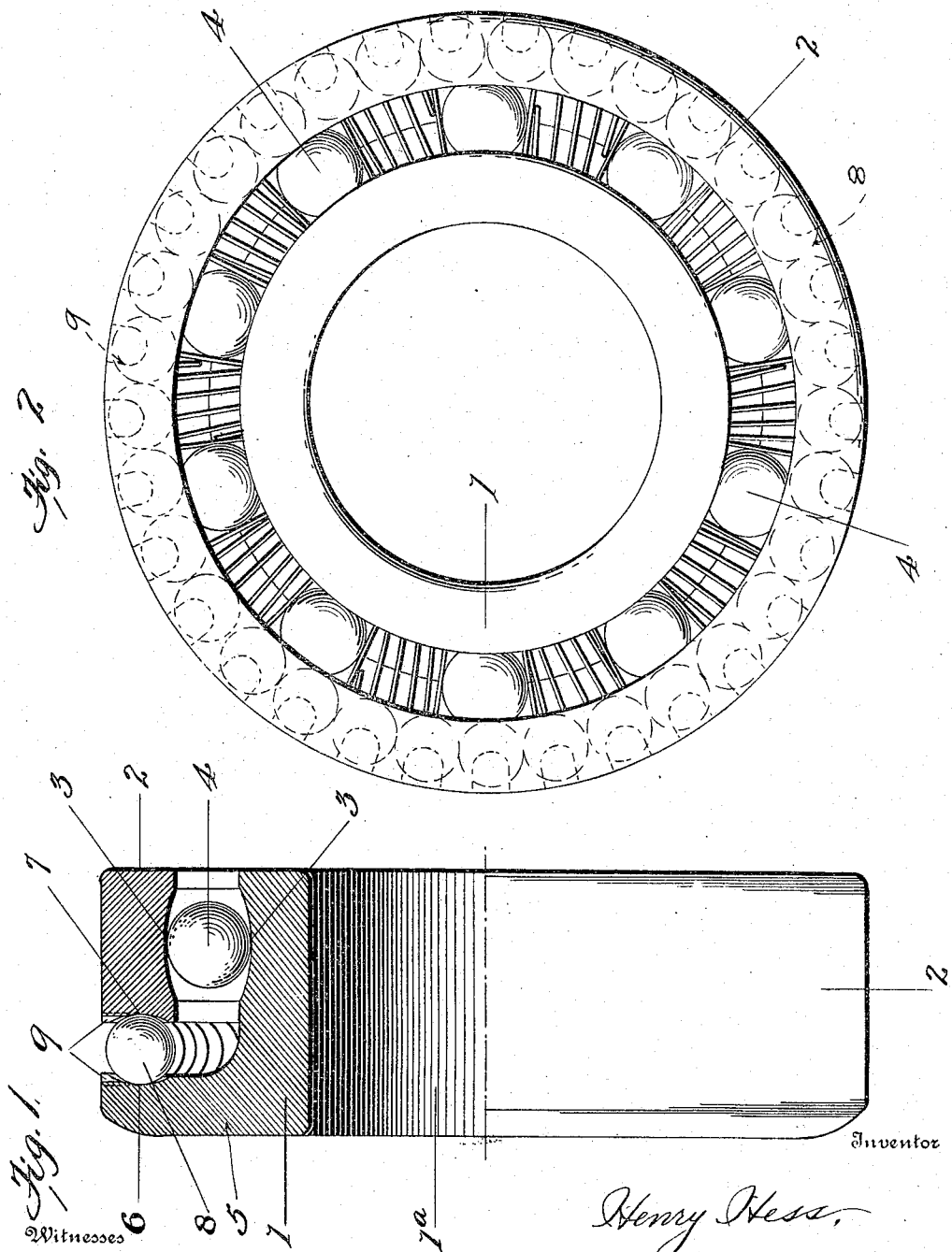

HENRY HESS, OF PHILADELPHIA, PENNSYLVANIA.

ROLLER-BEARING.

941,636.

Specification of Letters Patent. Patented Nov. 30, 1909.

Application filed February 21, 1907. Serial No. 358,639.

*To all whom it may concern:*

Be it known that I, HENRY HESS, a citizen of the United States, and a resident of Philadelphia, in the State of Pennsylvania, have invented certain new and useful Roller-Bearings, of which the following is a full, clear, and exact description.

My invention relates to roller bearings, and especially to bearings designed to carry a combined radial and thrust load; and an especial object is the provision of a bearing of this class which constitutes a single self-contained unit which may be handled, shipped and placed in working position as such.

The advantages and characteristics of my invention are hereinafter particularly set forth in connection with a detailed description of the accompanying drawing which illustrates an exemplifying structure embodying the invention, and in which,—

Figure 1 is a longitudinal section of a bearing embodying the invention, and Fig. 2 is an end view thereof.

Reference numeral 1 designates an inner bearing member or ring having a central bore 1$^a$; 2, an outer bearing member or ring; 3, races in rings 1 and 2; 4, balls running in races 3; 5, a flange formed preferably integrally with ring 1; 6, another race formed in flange 5; 7, another race formed in ring 2 opposite race 6; 8, balls running in races 6, 7; and 9, filling openings cut in flange 5 and ring 2 and communicating with races 6 and 7, respectively, these openings being cut not quite to the full depth of the races which they enter so that the continuity of the ball tread of the races is not interrupted.

Balls 4 and their races constitute the radial bearing adapted to support radial loads, and balls 8 and their races constitute the thrust bearing adapted to bear thrust loads.

Supposing the parts of the bearing to be separated it is assembled as follows: Rings 1 and 2 are placed eccentric to each other and a number of balls 4 sufficient to fill half the circumference of the races are placed between the rings, and the rings are then restored to concentric position and separators are placed between the balls so as to retain them in equidistant position around the entire circumference of the races. Suitable variations of this method of assembly, such, for instance, as are suggested in United States Letters Patent No. 838,303, dated December 11, 1906, to Robert Conrad, may be employed. When the radial bearing is assembled in the manner described its parts act to retain each other in position and they cannot be displaced unintentionally. The thrust bearing is then assembled by introducing balls 8 into races 6, 7, through filling openings 9, which are for this purpose placed opposite. It has been stated that openings 9 are not cut to the full depth of the races which they enter. The normal distance between the bottoms of the openings is, therefore, somewhat less than the diameter of balls 8. To enable the balls to pass through the openings, ring 2 is moved to the right in relation to ring 1 (as viewed in Fig. 1), the slight longitudinal play allowed by balls 4 permitting this movement. The upper side of ring 2 may also be tilted slightly to the right in relation to the lower side of the ring, and by these means the space between openings 9 is made sufficiently wide so that the balls may be inserted either freely or by the application of a greater or less degree of force. When balls 8 are in position, the bearing members are allowed to resume their normal relations and under these conditions the space between openings 9 is insufficient to permit dislodgment of balls 8.

In operation, on account of the shape of the filling openings 9, the balls 8 do not contact with the edges of the openings where they enter the races and there is, therefore, no possibility of crumbling the races or injuring the balls, and the carrying capacity of the bearing is not materially affected.

While I have described my invention as used in connection with spherical anti-friction members, it is to be understood that under some conditions other forms of anti-friction devices may be employed. Instead of providing flange 5 on the inner ring 1, this flange may be placed on the outer ring and turned inwardly, and the arrangement of races on the other ring changed accordingly.

Other changes in structure and arrangement may be made without departing from the spirit of the invention.

I claim:

1. The combination of an inner and an outer bearing ring having two opposite ball races of curved cross-section arranged to bear a radial load, and two other opposite races arranged to bear a thrust load, and balls in each set of races; and each bearing ring having a radial filling opening entering its thrust race at a depth less than that of the race.

2. A self-contained, combined radial and thrust ball-bearing, consisting of a bearing ring, a flanged bearing ring, said rings having two opposite races of curved cross-section for carrying a radial load and two other opposite races of curved cross-section of which one is formed in the flange of the flanged ring, for carrying a thrust load; the thrust races having relatively shallow filling openings communicating with them for the insertion of balls, and balls in each of the pairs of races.

3. The combination of two bearing rings having races of curved cross-section and balls therein constituting a radial bearing, said rings also having other races of curved cross-section and balls therein constituting a thrust bearing, one of the rings being provided with a filling opening communicating with its race belonging to the thrust bearing for inserting the balls.

4. A self-contained combined radial and thrust bearing comprising two rings, one of which is provided with a flange, the rings having two opposite races of curved cross-section, balls in said races, the races and balls constituting a radial bearing, yieldable separators interposed between said balls, the rings having two other opposite races of curved cross-section, and balls in the races last mentioned, said last races and balls constituting a thrust bearing, the rings having filling openings entering the thrust races, and shallower than the treads of the races, by means of which the thrust balls may be inserted and retained in the races.

5. A self-contained combined radial and thrust bearing comprising two rings, one of which is provided with a flange, the rings having two opposite races of curved cross-section, balls in said races, the races and balls constituting a radial bearing, yieldable separators interposed between said balls, the rings on each side of the radial races being formed with unbroken lips which provide a space between them less than the diameter of the balls, the rings having two other opposite races of curved cross-section, and balls in the races last-mentioned, said last races and balls constituting a thrust bearing, the rings having filling openings, entering the thrust races but shallower than the treads of the races, by means of which the thrust balls may be inserted and retained in the races.

In testimony whereof I have hereunto affixed my signature this 31st day of January, 1907, in the presence of two witnesses.

HENRY HESS.

Witnesses:
C. A. M'CALLA,
THEO. H. M'CALLA.